March 29, 1960 R. A. STEEL 2,930,764
PROCESS FOR MANUFACTURE OF FLUID TYPE CATALYSTS
Filed Dec. 31, 1954
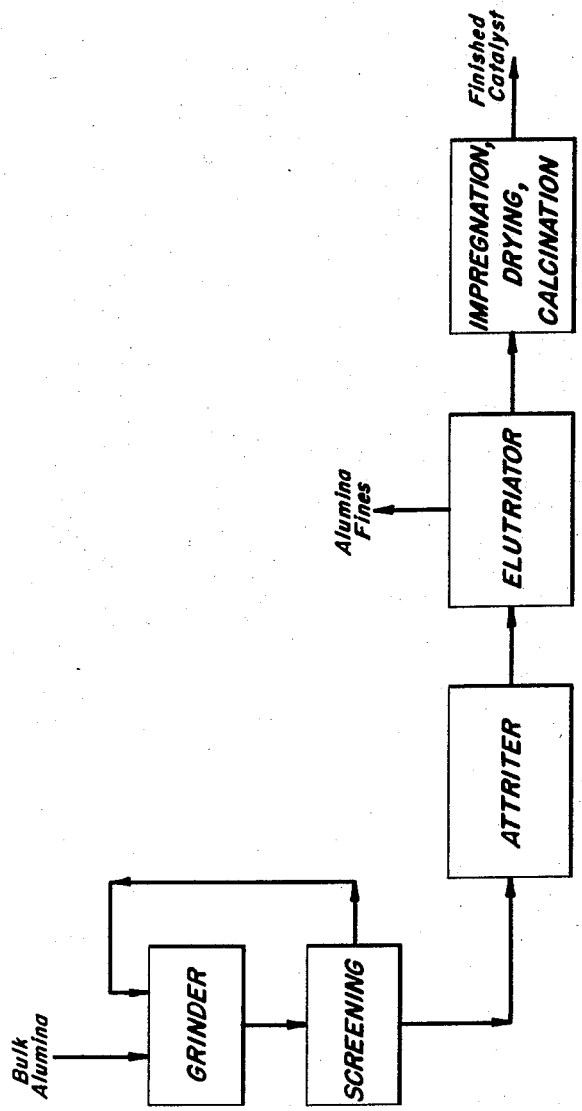
INVENTOR.
Robert A. Steel
BY
ATTORNEY United States Patent Office 2,930,764
Patented Mar. 29, 1960

2,930,764

PROCESS FOR MANUFACTURE OF FLUID TYPE CATALYSTS

Robert A. Steel, Valparaiso, Ind., assignor to Standard Oil Company, Chicago, Ill., a corporation of Indiana Application December 31, 1954, Serial No. 478,976

1 Claim. (Cl. 252—466)

My invention relates to the conversion of petroleum hydrocarbon fractions by reforming in the presence of a finely divided catalyst of the alumina base, platinum metal type which is handled in a fluidized state. More particularly, the invention relates to improvements in the manufacture of fluid type platinum-alumina reforming catalysts and to a process for producing a fluid type platinum-alumina of improved attrition resistance.

Commercial reforming operations with platinum-alumina type catalysts have been limited to date to use of fixed bed type reaction systems in which the catalyst is handled in pilled, extruded, or pelleted form. Although the use of a fluid type catalyst contacting system is attractive from the standpoint of isothermal reaction conditions and of providing ease and flexibility of regeneration, the use of the fluid type system in commercial reforming has been limited to operation with a molybdenum oxide-alumina type catalyst. The primary reason for this is the high cost of the platinum containing catalyst and the unwillingness of refiners to incur the expense of the high catalyst losses normally occurring in a fluidized system as a result of mechanical attrition. In a fluidized system, the catalyst is transferred as a stream of finely divided particles by means of the vaporized feed or a process gas or vapor stream at high velocity between the reaction and regeneration zones. Collisions between catalyst particles and impact on the walls of vessels and transfer lines and on valves break down the catalyst particles at a rate depending upon the nature of the catalyst and the severity of the mechanical handling conditions.

Catalyst fines formed by this attrition process are undesirable because they tend to interfere with good fluidization of the bulk of the catalyst particles and also overload catalyst recovery equipment. In conventional fluid catalyst cracking units and molybdena-alumina reforming units, objectionable accumulation of fines does not occur because of the continuous loss of material in the 0 to 20 micron range with the flue gases exiting from the regeneration zone. Daily losses, for example, may run as high as 3 to 5 tons per day from a fluid cracking unit of 25,000 barrels per day capacity. Obviously, high catalyst losses of this order cannot be tolerated with the more expensive reforming catalysts and particularly with a reforming catalyst containing platinum. It is possible to cut catalyst losses by investment in more elaborate and expensive fines recovery equipment such as filter systems and/or Cottrell electrical precipitators in conjunction with multi-stage cyclone separators, but these cost burdens together with the level of catalyst losses inevitable with conventionally manufactured fluid catalysts have been important factors in discouraging commercial installation of fluid type platinum-alumina reforming processes. It is an object of my invention to provide a process of catalyst manufacture which produces platinum-alumina catalyst of satisfactory attrition resistance for use in a fluid type processing system without undue losses or undue fines accumulation in the system with resulting harmful effect on fluidization. It is also an object of the invention to provide a manufacturing procedure which produces economies in catalyst production cost by minimizing platinum losses in manufacture and the need for reprocessing fines.

Platinum-alumina type catalysts are usually made by forming an alumina hydrosol in which platinum is incorporated by addition of a solution containing a compound of platinum in soluble or colloidal form. The resulting mixture is dried, calcined and ground to powder form suitable for handling in the fluidized state. Alternatively, the mixture may be spray dried in order to produce microspheroidal particles which are then calcined. The latter procedure is generally more expensive but the resulting microspheres may be less susceptible to attrition because of their symmetrical shape although they are difficult to produce in a satisfactory state of hardness. According to my invention, an alumina hydrosol is formed, dried and calcined before incorporation of platinum. The calcined alumina is reduced to finely subdivided form, advantageously less than about 150 microns in average diameter, by grinding. After separation of the desired particle size fraction, e.g. by screening to obtain a less than 100 mesh (Tyler) fraction advantageously free from excessive fines, the alumina is subjected to mechanical attrition, for example by means of a high velocity gas jet. Fines in the 0 to 20 micron range produced by the attrition are removed by elutriation. The attrition and elutriation steps may be conducted in sequence or in a unitary operation, and the procedure may be repeated as often as may be required to produce alumina particles of specification hardness, attrition resistance and size distribution. The elutriated fines may be recycled to the steps for preparation of the calcined particles. Platinum in the desired proportion is incorporated, advantageously by impregnation with a solution containing a platinum compound, in the attrited alumina fraction which essentially comprises particles in the 20 to 100 micron range. The manufacturing process is completed by drying the platinum-alumina particles and calcining at elevated temperature. The resulting catalyst particles have high resistance to attrition resulting from the break-down and elimination of weaker particles. Also, by reason of the fact that sharp edges and angular edges have been rounded off, the resulting catalyst is less erosive to vessels and lines, is less susceptible to attrition, and has improved fluidization properties. Thus, there is no need to resort to production of microspheroidal particles by spray drying or oil droplet techniques, but the invention may be applied thereto for quality improvement and manufacturing economy.

An advantageous mode for applying the invention is illustrated in the block diagram of the accompanying drawing. Bulk alumina is reduced in size by grinding so that a substantial portion of it will pass through the 100 mesh screen of the subsequent screening operation. Alumina particles which are coarser than 100 mesh, and thus do not pass through the screen, are returned to the grinding step. Alumina particles which pass through the screen are sent to an attriter. Here the alumina is subjected to attrition, preferably by a high-velocity gas jet. Particles which have low attrition resistance are broken up. The alumina is then elutriated to remove fine particles which have an average diameter of about 20 microns or less. Separation of the fines by elutriation is accomplished by fluidizing the alumina with a gas so as to maintain a dense fluidized bed. The gas velocity through the dense bed is adjusted so that the particles carried out of the elutriator in the exit gas stream are of a size predominantly smaller than 20 microns diameter.

The alumina following elutriation should contain not more than 1 weight percent of particles in the 0 to 20 microns range, determined by the Roller method, both for good fluidization and for minimization of losses. Resistance to attrition should be tested and found satisfactory for the contemplated conditions of operation and handling. A suitable test for determination of attrition rate is described by Forsythe, W. L., and Hertwig, W. R., Ind. Eng. Chem., 41, 1200 (1949). According to this method, a 50 gram sample of the catalyst is subjected to the attrition action of a high velocity air jet (70 p.s.i.g.) issuing from a 1/64" orifice at the center of a 1/8" stainless steel plate. The orifice plate is bolted between flanges at the bottom of a vertical 5 foot section of 1" inside-diameter Pyrex pipe. A weighed filter bag is clamped at the top of the glass pipe in order to prevent loss of catalyst entrained in the exit air stream. An air rate of 0.25 standard cubic foot per minute is maintained through the orifice for 1 hour. Under the contact conditions, the air velocity in the jet approaches the speed of sound, and the catalyst particles in its path are very highly accelerated. The high speed particles collide with slower moving particles in the fluidized bed up-stream of the orifice plate. After completion of the test (taking care to recover or account for all fines), the catalyst is dry screened in a Tyler Ro-Tap shaker to determine the change in particle size distribution. In applying my invention, it is preferable that the attrition rate, reported as the increase per hour in the 0 to 20 micron fraction should not exceed 5 to 6 weight percent.

If the above specifications are not met after the first pass through the attrition and elutriation steps, the alumina advantageously is fed back through the attriter and/or the elutriator as necessary to obtain material of the desired specifications. With experience, conditions can be set in the attrition and elutriation steps producing specification alumina in a single pass. Moreover, the attrition and elutriation steps can be combined into a single operation by admitting the gas to the elutriator as a high velocity jet capable of attrition. Thus, an alumina base material is produced which has high resistance to attrition, which is essentially free of fines and which has excellent fluidization properties because of rounded shape and controlled particle size range. A particularly suitable size range for good fluidization, determined by the Roller method, is; 0 to 20 microns, NMT 1%; 20 to 40 microns, 10 to 20%; and 80+ microns, NMT 40%.

Platinum is incorporated in the alumina base material advantageously by impregnation. For example, the alumina can be mixed with a solution of a platinum salt such as chloroplatinic acid or a platinum colloid such as that made by adding small quantities of ammonium sulfide to a dilute solution of chloroplatinic acid. For a platinum reforming catalyst, the concentration of platinum on the finished catalyst should be between 0.01 and about 1.0 percent. The resulting mixture is dried at 200 to 400° F. followed by calcination to 800 to 1200° F., preferably about 1100° F.

In a more specific example, an alumina hydrosol such as a sol prepared by the method described by Heard in U.S. Reissue Patent 22,196 is used in an amount equivalent to about 200 grams of $Al_2O_3$. After drying to approximately 60 percent $Al_2O_3$, the material is calcined at about 1100° F. for approximately 4 hours. The alumina is ground so that it passes through a 100 mesh screen. It is then subjected to attrition with a high velocity gas jet followed by elutriation to remove the 0 to 20 micron material. The 20+ micron material is tested by the before-mentioned attrition resistance test. 100 grams of the 20+ micron fraction having an attrition rate of no more than 6 percent is mixed, using vigorous stirring, with approximately 125 ml. of solution containing chloroplatinic acid equivalent to 0.6 gram of platinum and 0.2 gram of ammonium sulfide. The mixture is dried at about 220° F. for 16 hours followed by a calcination at 1100° F. for 4 hours.

Hence the invention provides means for producing a highly attrition resistant, platinum-alumina fluid type reforming catalyst. The invention also can be applied to the manufacture of other catalysts comprising alumina and a precious metal of the platinum family, e.g., palladium-alumina, iridium-alumina, ruthenium-alumina and the like. The invention provides economies in manufacture in that the precious metal is incorporated in attrition resistant particles of the desired size distribution rather than in the raw hydrosol or the bulk gel. Recovery and reprocessing of precious metal containing fines thus are avoided.

I claim:

A process for the manufacture of a fluid type catalyst comprising an alumina base and a platinum metal, which process comprises subdividing dried and calcined alumina to obtain a fraction finer than 100 mesh, subjecting said fraction to mechanical attrition and elutriation in a unitary operation by use of a high velocity gas jet as the elutriating medium, removing fines in the 0 to 20 micron range therefrom by said elutriation, incorporating the platinum metal in the 20+ micron fraction, and drying and calcining the alumina particles which contain the platinum metal.

References Cited in the file of this patent

UNITED STATES PATENTS

| 2,535,948 | Nicholson et al. | Dec. 26, 1950 |
| 2,606,159 | Owen | Aug. 5, 1952 |

OTHER REFERENCES

Ind. and Eng. Chem., vol. 41 of 1949, page 1200.